United States Patent Office 3,582,393
Patented June 1, 1971

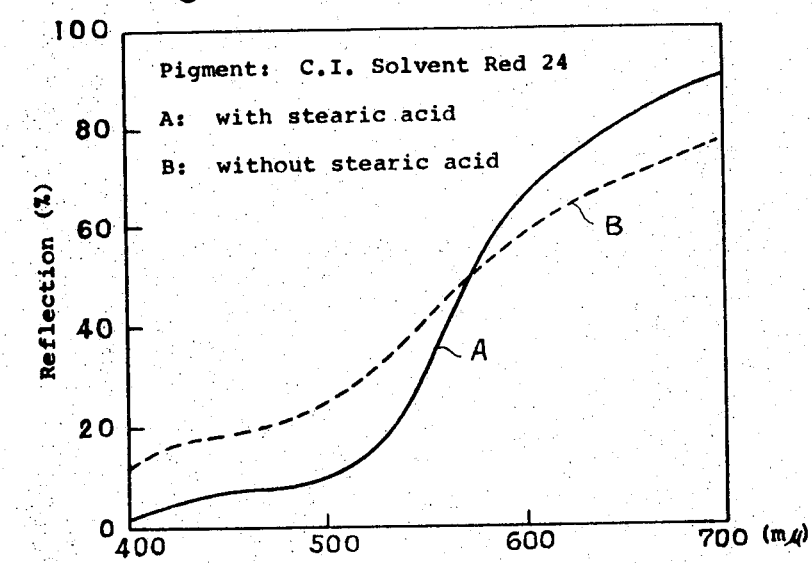
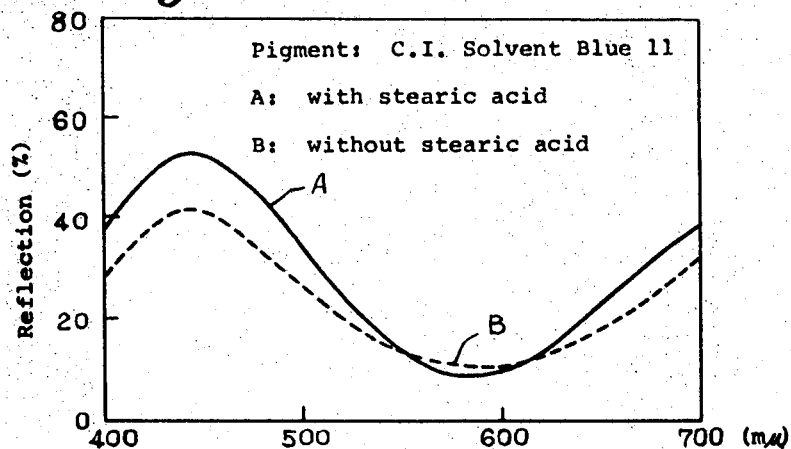
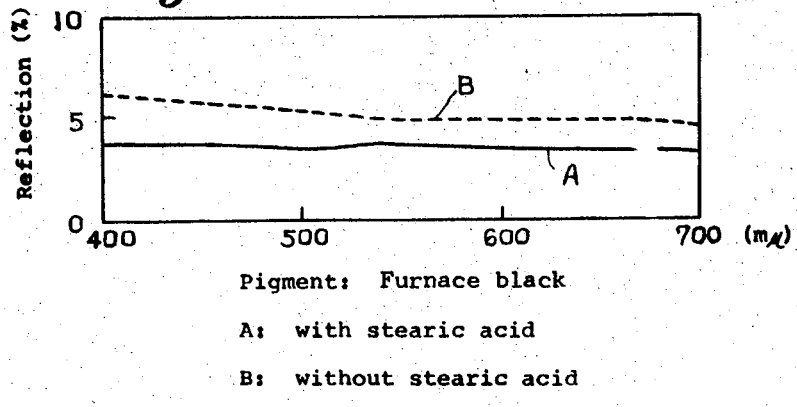

3,582,393
METHOD OF PRODUCING POROUS SHEET MATERIAL
Tatsunori Shikada, Osaka, Japan, assignor to Kanegafuchi Boseki Kabushiki Kaisha
Filed Nov. 4, 1968, Ser. No. 773,234
Claims priority, application Japan, Nov. 18, 1967, 42/74,355
Int. Cl. D06n 3/14; B44d 1/44
U.S. Cl. 117—63                    12 Claims

ABSTRACT OF THE DISCLOSURE

A hygroscopic organic solvent based coating solution containing polyurethane and 1–30% by weight (based on the polyurethane) of a higher fatty acid is applied to a surface of a base material. The applied coating solution is then coagulated in a coagulating bath consisting of an aqueous solution of an inorganic salt. It is then washed and dried. The fatty acid is selected from the group consisting of stearic acid, myristic acid, palmitic acid, lauric acid and oleic acid.

---

This invention relates to a novel and improved process for producing a sheet material having a porous structure. The sheet material is useful as synthetic leather.

An object of the present invention is to provide a process for producing a porous sheet material which consists mainly of polyurethane, is deep in tone when colored, and is light, and high in softness and moisture-permeability.

Processes for producing porous sheet materials are known, e.g., (a) a process wherein micro holes or pores are mechanically made in a film, (b) a process wherein a certain component is extracted out of a polymer film to form micropores, (c) a process wherein a latex of a synthetic resin or synthetic rubber is coagulated and (d) a process wherein a foaming agent is incorporated in a film. However, when a polyurethane is used as a film foaming polymer in these processes, it is difficult to make satisfactory porous sheets. For example, it is difficult to form a film of a foamed polyurethane which is applied to a base or used alone without a base. Particularly, when physical properties (adapted to synthetic leathers) such as toughness and low and high temperature resistance are required, the above mentioned processes are more difficult to put into practice on an industrial scale.

In order to obtain a porous sheet material which is light in weight and high in moisture-permeability and softness, it is necessary to form micro-pores, preferably uniform micro-pores for the purpose of imparting moisture-permeability, as well as comparatively large pores for the purpose of imparting softness and high porosity to the polymer sheet material.

In this respect, Belgian Pat. No. 636,018 discloses a process for producing a porous sheet in which a honeycomb-shaped porous layer is formed by coating at least one surface of a fibrous sheet material with a polyurethane solution and coagulating the solution layer with a non-solvent such as water so that large pores may be partitioned from each other with a wall of fine pores.

However, in such process, as is admitted in the patent, strict control is necessary over conditions such as the ratio of the solvent to the non-solvent, the viscosity of the coating solution, atmospheric humidity and the temperature under which the formation of the film is conducted. Therefore, difficulties are encountered in the industrial practice of said process. For example, in such process, if the surface layer of the film is exposed to moisture until the layer coagulates before it is bath-treated with a non-solvent, the pores in the resulting porous layer will remain less than 20 microns in diameter and various desirable properties attributable to the honeycomb-shaped layer will not be obtained. In an example of the Belgian patent it is disclosed that the room temperature during the coating operation with polyurethane solution was 21° C. and the relative humidity was 20%. It is further disclosed that a higher humidity will cause faster coagulation and therefore, to produce a desirable cellular structure, higher humidity must be avoided. However, it is very difficult to keep a strict control over atmospheric conditions between the coating step and the coagulating step in actual industrial practice.

There is further mentioned in said patent a process wherein a "colloid solution," prepared by adding to a polyurethane solution a proper amount of a nonsolvent (for the polyurethane) such as water or methanol, is applied on a substrate and coagulated. However, in point of fact, the proper amount of said nonsolvent is difficult to determine because it varies considerably depending upon the conditions under which it is added, the degree of polymerization and the composition of the polymer. Further, there are additional difficulties in that local coagulation and gelling of the polymer solution will occur unless very careful attention is paid in the addition of the nonsolvent.

A wet-coagulating process, wherein water is used as a coagulating agent, is known. However, difficulties are encountered in the process. The surface layer of the polyurethane solution coating will quickly coagulate in contact with water to form a compact structure which delays further penetration of the water into the interior of the coating layer or film. Thus a strain will be produced between said surface layer of the film wherein the coagulation is quick and the interior wherein the penetration of water is slow. As a result, local and non-uniform large pores are apt to form in the interior, and as a whole the resulting sheet will not have the desired moisture-permeability and softness.

I have developed an improved process for easily producing a porous sheet material which is light, tough and high in moisture-permeability and softness. Further, it gives a deep tone when colored. Thus, according to the present invention, a hygroscopic organic solvent solution of a polyurethane or of a mixture of polymers consisting mainly of polyurethane and to which is added 1 to 30% by weight (based on the polyurethane) of at least one higher fatty acid selected from the group consisting of stearic acid, myristic acid, palmitic acid, lauric acid and oleic acid, is applied on at least one surface of a fibrous base or a film-making plate, and is subjected to wet-coagulation and then washed with water and dried. When the surface layer of the resulting porous sheet is ground or subjected to buffing, a suede-leatherlike sheet having excellent appearance, hand and moisture-permeability, is obtained.

Among the features and advantages of this invention are as follows:

(a) By adding 1 to 30% by weight of said higher fatty acid to the coating polymer solution, the difference in the coagulating and regenerating rate between the interior and surface portion of the coated film (polymer solution layer) can be properly and automatically adjusted so that a homogeneous porous structure may be formed.

(b) By varying the amount of higher fatty acid added, the diameter and the number of pores in the porous sheet can be adjusted over a wide range. Particularly, in the case of forming a suede-leatherlike sheet by grinding the surface of the porous layer, the hand and softness can be varied as desired to simulate any kind of leather (from Nubuck to Velour type).

(c) By adding the higher fatty acid to the polymer solution, the dispersion of the pigment therein is remarkably improved, secondary coagulation of the pigment can be prevented and a deep color can be given to the porous body.

(d) The particular higher fatty acid used in the present invention is inexpensive. Further, it is chemically inert with respect to the polyurethane and such solvent as dimethyl formamide so that the coating polymer solution is not adversely affected. When the coating is coagulated in a coagulating bath, the fatty acid is washed out of the coating and can be easily recovered from the coagulating bath.

(e) In the process of the present invention, the operative steps are made far simpler than in any conventional process for producing porous sheets and a porous sheet which is light, tough, high in moisture-permeability and high in softness is obtained. Further, by grinding and cutting the surface of the resulting porous sheet, one can make a suede-leatherlike sheet which is excellent in appearance, tone, hand and moisture-permeability.

The polyurethane to be used in the present invention may be conventionally used polyurethane elastomer. Generally, an organic diisocyanate and a polyalkylene ether glycol or a polyester having terminal hydroxyl groups are co-reacted to produce a prepolymer. The prepolymer is subjected to a chain-extending reaction with a chain-extender such as a diamine, diol or polyol to form a linear polyurethane elastomer.

Examples of organic diisocyanates are aromatic, aliphatic or alicyclic diisocyanates or a mixture of same, such as, for example, toluylene 2,6-diisocyanate, toluylene 2,4-diisocyanate, diphenylmethane 4,4'-diisocyanate, 1,5-naphthylene diisocyanate, hexamethylene diisocyanate or para-xylylene diisocyanate.

Examples of polyalkylene ether glycols are polyethylene ether glycol, polypropylene ether glycol, polytetramethylene ether glycol or polyhexamethylene ether glycol or a copolymer or mixture of same. Further, as the polyol one may use glycerin or trimethylol propane.

The polyesters to be used may be polycondensation products of organic acids and glycols. Preferred glycols include polyalkylene glycol, such as ethylene glycol, propylene glycol, tetramethylene glycol or hexamethylene glycol, cyclic glycol such as cyclohexane diol or aromatic glycol such as xylylene glycol. Examples of said acids include succinic acid, adipic acid, sebacic acid and terephthalic acid.

Examples of the chain extenders are such diamines as, for example, hydrazine, ethylene diamine or methylene diorthochloraniline.

Catalysts which may be employed include triethylamine, triethylene diamine, N-ethyl morpholine, dibutyl tin dilaurate and cobalt naphthenate.

The polyester having hydroxyl groups may be obtained by ring-opening-polymerizing a lactone in the presence of a small amount of a glycol or by polycondensing an excess diol with a dicarboxylic acid. The preferred average molecular weight of such polyester is about 500 to 3,000. As the lactone, there may be used, for example, δ-valerolactone, ε-butyrolactone and -caprolactone.

Since these polyurethanes are well known per se in the art, no further detailed explanation of same will be necessary.

The polyurethane thus prepared is dissolved in a hygroscopic solvent. If desired, a small amount of other film-forming polymer(s) soluble in said solvent, for example, vinyl polymers such as polyvinyl chloride, polyvinyl alcohol, polyacrylonitrile, polyacrylic ester or polyacrylic acid may be added to the polyurethane solution.

It is essential that the solvent be extractable with water, alcohol or an aqueous solution of an inorganic salt. Therefore, a hygroscopic organic solvent is used. Examples of such solvent are N,N'-dimethyl formamide, dimethyl sulfoxide, tetrahydrofuran, tetramethyl urea, N,N'-dimethyl acetamide, dioxane and butyl carbinol. A mixture of two or more of these solvents may also be used. However, the most preferred solvent is N,N'-dimethyl formamide. Further, ketones (e.g. acetone, methyl ethyl ketone, etc.) which are not good solvents for polyurethane alone but are miscible with the polymer solution may be used as a diluent in a range not coagulating said polymer.

The polyurethane solution to be used in the present invention is a viscous solution containing the above mentioned polyurethane elastomer and said higher fatty acid. If desired, the solution may further contain a coloring agent (dye or pigment), a light stabilizer, an antistatic agent, a dispersing agent, a reinforcing agent (e.g. talc) and any other additive.

The coating polymer solution may be prepared by dissolving the polyurethane elastomer in said organic solvent and then adding said higher fatty acid and other additive(s) to the solution or by dissolving a mixture of the polyurethane elastomer and said higher fatty acid directly into the organic solvent.

The amount of polyurethane elastomer to be contained in said solution may vary depending on its degree of polymerization and its chemical structure. However, the concentration should be within a range such that the solution will remain in solution form when the higher fatty acid is added (i.e., remain stable) for a long period of time at a temperature below 30.0° C. and be adjustable to a viscosity of 5,000 to 100,000 centipoises. At this viscosity the solution can be easily applied onto a substrate or base material. The amount of the polyurethane elastomer (polymer concentration in the solution) is 10 to 40% by weight, preferably 15 to 35% by weight based on the solvent. If it is below 10%, the coagulating velocity will be unduly low and the properties of the resulting film will be apt to deteriorate. Above 40%, the viscosity will be so high that the coating operation will be difficult and the quality of the resulting film will be apt to deteriorate.

The amount of said higher fatty acid to be added to the polymer solution varies depending on the concentration of the polyurethane elastomer in the coating solution and also on the temperature of the coagulating bath. However, it is generally in the range of 1 to 30% by weight, preferably 5 to 20% by weight based on the polyurethane elastomer. If the amount is less than 1%, the moisture-permeability of the resulting film will be reduced. If it is more than 30%, there will be a remarkable loss in the quality of the resulting film.

The higher fatty acid is selected from the group consisting of lauric acid, myristic acid, palmitic acid, stearic acid, oleic acid and a mixture of two or more of them. In using it, the required amount of said higher fatty acid in the form of powder or flakes is added to the polyurethane solution and is mixed and uniformly dissolved. Such higher fatty acid is nonhygroscopic and is insoluble in water. However, it is readily soluble in such organic solvent as N,N'-dimethyl formamide.

The polyurethane solution (coating solution) so prepared is applied to a suitable base or substrate for synthetic leather such as woven fabric, knit fabric, non-woven fabric, sponge or paper, or to a film-making plate such as a glass plate, metal plate, plastic plate or plastic film by knife-coating, roller coating or spraying.

In such case, even if the applied solution absorbs more or less moisture between the coating step and the coagulating step, due to the action of said higher fatty acid, there will be no fear of a rise in viscosity and gelling of said solution. Further, the coating operation can be carried out easily even in an atmosphere of high humidity. The coagulation and regeneration in the coagulating bath proceed smoothly. It is not at all necessary to strictly adjust and control the atmosphere (relative humidity and temperature) during the coating and subsequent operations as in the process of Belgian Pat. No. 636,018.

For the coagulating bath, there may be used water or an aqueous solution of an inorganic salt or a liquid (e.g. methanol, isopropanol) which is a nonsolvent for the polyurethane but which is miscible with the solvent used for the preparation of the coating polymer solution. There may also be used a mixture of these liquids, for example, an aqueous solution of methanol, a solution prepared by mixing a solvent for the polyurethane to such degree as will not dissolve the polyurethane as, for example, an aqueous solution of dimethyl formamide and an aqueous solution of an inorganic salt containing dimethyl formamide. Among them, most preferable are water and an aqueous solution of an inorganic salt.

Examples of the inorganic salt used in the preparation of the aqueous solution of an inorganic salt as a coagulating agent include at least one member selected from the group consisting of ammonium sulfate, sodium sulfate and sodium chloride.

The concentration of said inorganic salt in the coagulating bath may vary depending on the kind of salt, the amount of higher fatty acid in the polyurethane solution and the concentration of the polyurethane solution. However, it is generally below the amount (by weight) corresponding to ⅔ (preferably below ⅓) the concentration of the saturated aqueous solution. At such high concentration, as above ⅔ saturation, the coagulating velocity of the polyurethane solution film will be so reduced that the coagulated film will form too compact a structure, thereby making it difficult to obtain the desired porous sheet.

The coagulating bath temperature may be in the range of 5 to 50° C., preferably 20 to 40° C.

The said inorganic salt in the coagulating bath is chemically inert to such solvent as N,N'-dimethyl formamide so that there is no danger of inducing hydrolysis. Thus the solvent can be easily recovered.

It is desirable and convenient that the coagulating bath temperature be near the normal or room temperature. However, in some cases, the temperature may be varied so as to vary the coagulating activity of the salt solution. Generally, at the same salt concentration, there is a tendency that the lower the temperature, the lower the coagulating activity will be and that the higher the temperature, the higher the coagulating velocity will be. However, the temperature range which affords favorable coagulation and regeneration is sufficiently wide so that there is no difficulty in selecting the bath temperature.

The base material or a film-making plate on which has been applied the coating solution in a desired thickness is dipped for a predetermined time in the coagulating bath so as to coagulate and regenerate the polymer. Then the material is washed with water or hot water to remove the hygroscopic organic solvent and the higher fatty acid remaining in the regenerated polyurethane film. The material is then dried.

When the coating polymer solution is applied onto a film-making plate such as a glass plate, metal plate or plastic plate and is coagulated and regenerated thereon, the resulting film which has a porous structure will be formed as bonded and laminated on said plate. Therefore, it is washed with water, dried and peeled off the plate. The resultant film is tough, light, and high in softness and moisture-permeability.

When the coating polymer solution is applied to a fibrous or other base suitable for synthetic leather, such as a woven fabric, knit fabric, nonwoven fabric, film, sponge or paper, the resulting materials may be used as man-made leather.

When the compact surface portion of the porous layer bonded and laminated on the above mentioned base material is subjected to buffing with a leather grinding (buffing) apparatus provided with a grinding paper coated with silica, emery, aluminum oxide, silicon carbide or the like, one obtains a suede-leatherlike sheet material which is excellent in appearance, hand and moisture-permeability.

When a cross section of the resulting porous layer made by applying the polymer solution onto one or both surfaces of a base such as for example a glass plate, metal plate, plastic plate or the like and subjecting it to the above mentioned treatment, is microscopically examined, one observes pores of diameter 20 to 100 microns uniformly distributed and substantially vertical to the sheet surafce. This pore characteristic accounts for the fact that the porous layer is strong, light, very soft, and has high moisture-permeability.

The porous sheet material obtained by the present invention is useful as surface leathers for room interior decorations, for packages, handbags, gloves, boots, shoes and for clothes. The suede-leatherlike sheet is useful as the upper leather of shoes, for jackets and other coats, decorative leather-lined trunks and for covers of tables and rolls.

The invention will now be explained with reference to the following examples, and the drawing in which FIGS. 1 to 3 represent the results obtained by measuring surface reflection rates with a self-recording spectrophotometer (made by General Electric Company).

The following examples are given only for the purpose of illustrating the invention. It should be noted that in the examples all parts are by weight. In these examples, the breaking strength and elongation were measured on a sample having a width of 2 cm., a length of 5 cm. and at a tensioning velocity of 3 cm./min., using an Instron tester. The moisture-permeability was measured by the method of JIS-6429. The surface wear was measured by the method of JIS-L-1048-59.

EXAMPLE 1

105 parts of a polyethylene adipate having terminal OH groups and an average molecular weight of 1050 were dissolved in 200 parts of anhydrous dioxane. 40.0 parts of methylene bis (4-phenyl isocyanate) were added thereto and the solution was kept at 80° C. for 2 hours in a nitrogen atmosphere. The solution was then cooled to 30° C. 3.7 parts of ethylene glycol and 0.02 part of triethylene diamine together with 100 parts of anhydrous dioxane were then added to the thus obtained N-NCO active prepolymer to carry out a chain-extending reaction. The system was maintained for an additional 3 hours to complete the reaction. Then the polymer solution was cooled and poured into water to remove the greater part of the dioxane. The separated polymer was then dried at 80° C. under reduced pressure. Sufficient polymer was dissolved in N,N'-dimethyl formamide to bring the polymer concentration to 30% by weight. The viscosity of the polymer solution was 45,000 centipoises at 30° C.

Then, into this polymer solution there were added and mixed stearic acid, palmitic acid, oleic acid or lauric acid in the various amounts shown in Table 1. The solution was applied by knife-coating onto a glass plate so as to be 1.0 mm. thick and was introduced into water at 35° C. for 60 minutes. The plate with the film formed thereon was washed with warm water (60° C.) to remove the N,N'-dimethyl formamide remaining in the film and was then air-dried at 100° C. for 5 minutes.

As a result of observing the cross-sectioned structure of the thus obtained regenerated polyurethane film and measuring the moisture-permeability and specific gravity, it was found that the film made by adding 1 to 30 parts of stearic acid, palmitic acid, oleic acid or lauric acid per 100 parts of the polyurethane elastomer showed a porous structure in which pores of diameter 10 to 100 microns were uniformly distributed substantially vertical to the sheet surface. Moreover, its moisture-permeability and softness were very high. The film formed from a polymer solution containing 5 to 20 parts of said higher fatty acid per 100 parts of the polymer was particularly excellent.

Further, the film made under the same conditions, except that no fatty acid was added to the polymer solution, was lower in porosity, higher in specific gravity and lower in moisture-permeability and softness.

TABLE 1

| Polymer concentration (percent) | Higher fatty acid added | Amount (parts) of fatty acid per 100 parts of polymer | Cross-sectioned structure of film | Thickness (mm.) | Specific gravity | Moisture-permeability (mg./cm.²/ hours) |
|---|---|---|---|---|---|---|
| 30 | None | 0 | Non-uniform voids | 0.66 | 0.52 | 5.3 |
| 25 | do | 0 | do | 0.64 | 0.51 | 6.0 |
| 30 | Stearic acid | 0.5 | do | 0.67 | 0.51 | 7.2 |
| 25 | do | 0.5 | do | 0.65 | 0.48 | 8.3 |
| 30 | do | 1.0 | Porous | 0.69 | 0.49 | 9.3 |
| 25 | do | 1.0 | do | 0.67 | 0.47 | 9.8 |
| 30 | do | 3.0 | do | 0.70 | 0.43 | 9.8 |
| 25 | do | 3.0 | do | 0.71 | 0.41 | 10.5 |
| 30 | do | 5.0 | do | 0.72 | 0.40 | 10.3 |
| 25 | do | 5.0 | do | 0.73 | 0.37 | 14.2 |
| 30 | do | 10.0 | do | 0.74 | 0.34 | 13.6 |
| 25 | do | 10.0 | do | 0.76 | 0.32 | 17.6 |
| 30 | do | 20.0 | do | 0.79 | 0.27 | 23.2 |
| 25 | do | 20.0 | do | 0.81 | 0.22 | 26.9 |
| 30 | do | 30.0 | do | 0.83 | 0.23 | 25.3 |
| 25 | do | 30.0 | do | 0.83 | 0.22 | 28.3 |
| 30 | do | 40.0 | do | 0.99 | 0.19 | 28.6 |
| 25 | do | 40.0 | do | 0.96 | 0.20 | 28.5 |
| 30 | Palmitic acid | 5.0 | do | 0.70 | 0.44 | 13.1 |
| 25 | do | 5.0 | do | 0.70 | 0.43 | 16.3 |
| 30 | do | 10.0 | do | 0.72 | 0.38 | 15.5 |
| 25 | do | 10.0 | do | 0.73 | 0.31 | 17.5 |
| 30 | do | 20.0 | do | 0.76 | 0.32 | 20.1 |
| 25 | do | 20.0 | do | 0.77 | 0.30 | 23.2 |
| 30 | Oleic acid | 5.0 | do | 0.69 | 0.47 | 11.4 |
| 25 | do | 5.0 | do | 0.70 | 0.42 | 15.4 |
| 30 | do | 10.0 | do | 0.72 | 0.40 | 12.4 |
| 25 | do | 10.0 | do | 0.73 | 0.38 | 17.8 |
| 30 | do | 20.0 | do | 0.74 | 0.35 | 14.2 |
| 25 | do | 20.0 | do | 0.77 | 0.31 | 18.3 |
| 30 | Lauric acid | 5.0 | do | 0.67 | 0.51 | 8.3 |
| 25 | do | 5.0 | do | 0.66 | 0.48 | 10.2 |
| 30 | do | 10.0 | do | 0.71 | 0.43 | 15.1 |
| 25 | do | 10.0 | do | 0.71 | 0.41 | 16.2 |
| 30 | do | 20.0 | do | 0.73 | 0.38 | 17.2 |
| 25 | do | 20.0 | do | 0.72 | 0.33 | 18.5 |

EXAMPLE 2

A coating solution having a viscosity of 3,000 centipoises 25° C. was prepared by adding 10 parts of dimethyl formamide, 4 parts of stearic acid and 4 parts of each of C.I. Solvent Red 24, (aminoazotoluene-B-naphthol, C.I. Solvent Blue 11 (1-p-toluidino-4-methyl-aminoanthraquinone) and furnace black into 100 parts of a 35% dimethyl formamide solution of ester type polyurethane (trademark: Crysbon, produced by Japan Reich Company). The coating solution was applied on a nonwoven fabric (formed of polyester fibers, thickness 0.6 mm.) so as to form a coating which was 0.6 mm. thick. Then the coated fabric was introduced at an angle of 60 degrees into a coagulating bath consisting of water at a temperature of 30° C. through rolls, for 20 minutes. The fabric was then immersed in a hot water bath at 70° C. for 20 minutes, dried with a dryer and wound up.

When the surface of the porous layer (0.4 mm. thick) of the resulting sheet was ground to a depth of 0.2 mm. with sandpaper, there was obtained a suedelike sheet having a structure which looks as if 30–50 micron scaly hairs of urethane elastomer were implanted in it. The thus obtained suedelike sheet had a density of 0.50 to 0.53 g./cm.³, a tensile strength of 1.1 kg./cm.², and a moisture-permeability of 3 to 5 mg./cm.²/hr. There was no change observed even after 1,000 wear resistance tests. The results obtained on measuring the surface reflection rates with a self-recording spectrophotometer (made by General Electric Company) are shown in the accompanying FIGS. 1, 2 and 3. As is apparent from these results, when stearic acid is used in the process of the present invention, there is obtained a product which is much clearer and deeper in color tone than when stearic acid is not added.

EXAMPLE 3

An elastomer solution having a viscosity of 60,000 centipoises at 25°C. was prepared by adding 10% by weight of palmitic acid and 5% by weight of a pigment (C.I. Solvent Blue 11) based on the polyurethane elastomer into a 35% (by weight) N,N′-dimethyl formamide solution of an ester type polyurethane. The elastomer solution was applied to coat the napped surface of a staple fiber flano texture with a 0.6 mm. thick coating. The coated material was dipped in warm water (35° C.) for 30 minutes. Then the material was treated with hot water (70° C.) for 30 minutes, and dried. The porous layer (0.4 mm. thick) was ground to a depth of 0.2 mm. with sandpaper to obtain a velvety sheet. This sheet had a density of 0.48 g./cm.², a tensile strength of 1.2 kg./cm.² and showed no change in surface wear (by JIS–L–1048–59) after 1,000 tests. Further, this sheet was deep blue in color and was useful for clothes and bags.

EXAMPLE 4

A coating solution was prepared by adding 20% lauric acid and 5% of a pigment (furnace black), based on the weight of the polyurethane, into a 20% dimethyl formamide solution of an ester type polyurethane (trademark: Paraplane 22, product of Hodogaya Chemical Co., Tokyo, Japan). The coating solution was applied to a 1 mm. thick nonwoven fabric (polyester fiber to produce a 0.4 mm. thick coating. The coated material was dipped for 20 minutes in a water bath at 30° C. Then the material was trated in hot water (60° C.) for 20 minutes and was dried. The thus obtained sheet showed a deep black color, a strength of 1.5 kg./cm.², an elongation of 90%, a moisture-permeability of 3.8 mg./cm.²/hr. and showed no change in surface wear after 1,000 tests. This sheet was useful for making shoes, bags and interior decorations.

EXAMPLE 5

A painting solution having a viscosity of 55,000 centipoises (25° C.) was prepared by adding 5% oleic acid and 5% of a pigment (C.I. Solvent Red 24), based on the polyurethane elastomer, into a 30% (by weight) dimethyl formamide solution of an ester type polyurethane. The painting solution was applied to coat the napped surface of a flano texture so as to form a coating which was 0.7 mm. thick. The coated fabric was treated in a water bath at 25° C. for 20 minutes. Then the sheet was treated with hot water at 80° C. for 10 minutes, and dried. The porous surface layer (0.5 mm. thick) was ground to a depth of 0.2 mm. with sandpaper to prepare a suedelike sheet. The sheet was deep red in color and was useful for making clothes.

EXAMPLE 6

A coating solution having a viscosity of 65,000 centipoises (25° C.) was prepared by adding 5% stearic acid and 3% of a pigment (furnace black), based on the polyurethane to a 35% (by weight) dimethyl formamide solution of ester type polyurethane (same as that used in Example 2). The coating solution was applied to coat a cotton broadcloth (120 deniers) with a 0.4 mm. thick coating. The coated fabric was passed over guide rolls through warm water (35° C.) for 10 minutes. The sheet was then treated with hot water (80° C.) for 10 minutes and was dried. The obtained porous sheet was bonded to a nonwoven fabric having a thickness of 1 mm. The laminated sheet had a tensile strength of 1.5 kg./cm.$^2$, an elongation of 70% and a moisture-permeability of 5 mg./cm.$^2$/hr. It was deep black in color and was useful for making shoes, bags and interior decorations.

EXAMPLE 7

A coating solution was prepared by adding 4% of a higher fatty acid and 4% of a pigment (furnace black), based on the weight of the polyurethane, into a 30% (by weight) N,N'-dimethyl formamide solution of the same polyurethane as used in Example 1. The coating solution was applied by knife-coating onto a nonwoven fabric (thickness 0.6 mm.) consisting of polyester fibers. The coated sheet was then dipped for 30 minutes in a coagulating bath (30° C.) consisting of an aqueous solution containing 50 g./l. of dimethyl formamide (DMF) and 150 g./l. of an inorganic salt (sodium sulfate or sodium chloride). The material was washed for 30 minutes with water at 60° C. and was dried with hot air. The thus obtained porous sheet was deep black in color, was very high in moisture-permeability as shown in Table 2 and was very useful for shoe making and room interior decorations.

TABLE 2

| Coating solution | | Coagulating bath | | | Moisture-permeability (mg./cm.$^2$/hour) |
|---|---|---|---|---|---|
| Higher fatty acid | Amount | Salt | Concentration (g./l.) | DMF concentration (g./l.) | |
| Stearic acid | 10 | | | 50 | 11.0 |
| Do | 10 | Sodium sulfate | 150 | 50 | 11.5 |
| Do | 10 | Sodium chloride | 150 | 50 | 11.2 |
| Myristic acid | 10 | | | 50 | 10.9 |
| Do | 10 | Sodium sulfate | 150 | 50 | 10.8 |
| Do | 10 | Sodium chloride | 150 | 50 | 10.5 |
| Palmitic acid | 10 | | | 50 | 11.2 |
| Do | 10 | Sodium sulfate | 150 | 50 | 11.2 |
| Do | 10 | Sodium chloride | 150 | 50 | 10.5 |
| Oleic acid | 10 | | | 50 | 9.5 |
| Do | 10 | Sodium sulfate | 150 | 50 | 9.8 |
| Do | 10 | Sodium chloride | 150 | 50 | 9.9 |
| Lauric acid | 10 | | | 50 | 9.4 |
| Do | 10 | Sodium sulfate | 150 | 50 | 9.8 |
| Do | 10 | Sodium chloride | 150 | 50 | 9.9 |
| Not added | 0 | | | 50 | 4.5 |
| Do | 0 | Not added | Water alone | | 5.0 |

EXAMPLE 8

The coating polymer solution used in Example 1 was applied by knife-coating onto a glass plate so as to form a 1.0 mm. thick coating. The coated plate was dipped for 30 minutes in an aqueous solution of a salt, indicated in the following table, at 30° C. The plate with a coagulated film thereon was then washed with warm water (70° C.) for 30 minutes to remove the N,N'-dimethyl formamide and the salt remaining in the film. It was then air-dried at 100° C. for 10 minutes. The results of measuring the properties of the thus obtained film are as shown in Table 2.

As is evident from the results shown in Table 3, when a salt was added to the coagulating bath, a soft porous film which was high in moisture-permeability was formed. But, when the amount of the salt was increased, the porosity tended to be somewhat reduced (the specific gravity slightly increased). Further, when potassium sulfate or potassium chloride was used in place of sodium sulfate or sodium chloride, the same tendency was observed.

TABLE 3

| Higher fatty acid | | Coagulating bath | | Cross-sectioned structure of the film | Thickness (mm.) | Specific gravity | Moisture-permeability (mg./cm.$^2$/hour) |
|---|---|---|---|---|---|---|---|
| Kind | Amount (percent based on polymer) | Salt | Concentration (g./l.) | | | | |
| Not added | 0 | Sodium sulfate | 150 | Compact | 0.52 | 0.63 | 4.2 |
| | 1 | do | 100 | Porous | 0.66 | 0.46 | 15.6 |
| | 1 | do | 200 | do | 0.60 | 0.60 | 12.3 |
| | 5 | do | 100 | do | 0.69 | 0.34 | 8.4 |
| | 5 | do | 200 | do | 0.64 | 0.58 | 13.4 |
| | 10 | do | 50 | do | 0.74 | 0.38 | 21.4 |
| | 10 | do | 100 | do | 0.73 | 0.39 | 20.8 |
| | 10 | do | 150 | do | 0.71 | 0.42 | 18.8 |
| | 10 | do | 200 | do | 0.64 | 0.52 | 13.2 |
| | 10 | do | 250 | do | 0.59 | 0.59 | 11.8 |
| Stearic acid | 20 | do | 100 | do | 0.73 | 0.35 | 22.4 |
| | 20 | do | 200 | do | 0.70 | 0.41 | 18.1 |
| | 30 | do | 100 | do | 0.76 | 0.35 | 23.5 |
| | 30 | do | 200 | do | 0.69 | 0.43 | 16.6 |
| | 10 | Sodium chloride | 100 | do | 0.74 | 0.39 | 20.6 |
| | 10 | do | 200 | do | 0.71 | 0.40 | 20.2 |
| | 0.5 | Sodium sulfate | 100 | Void | 0.56 | 0.60 | 5.9 |
| | 0.5 | do | 200 | do | 0.54 | 0.61 | 6.2 |
| | 40 | do | 100 | Difficult to coagulate | | | |
| | 40 | do | 200 | do | | | |
| Myristic acid | 10 | Sodium sulfate | 150 | Porous | 0.73 | 0.38 | 21.2 |
| | 10 | Sodium chloride | 150 | do | 0.74 | 0.35 | 23.2 |
| Palmitic acid | 10 | Sodium sulfate | 150 | do | 0.71 | 0.40 | 19.2 |
| | 10 | Sodium chloride | 150 | do | 0.69 | 0.43 | 18.3 |
| Oleic acid | 10 | Sodium sulfate | 150 | do | 0.68 | 0.45 | 15.2 |
| | 10 | Sodium chloride | 150 | do | 0.67 | 0.43 | 16.2 |
| Lauric acid | 10 | Sodium sulfate | 150 | do | 0.64 | 0.52 | 10.4 |
| | | Sodium chloride | 150 | do | 0.65 | 0.49 | 9.5 |

What is claimed is:

1. A process for producing a porous sheet material comprising the steps of applying to a surface of a base material a hygroscopic organic solvent based coating solution consisting essentially of polyurethane, and 1 to 30% by weight (based on the polyurethane) of at least one higher fatty acid selected from the group consisting of stearic acid, myristic acid, palmitic acid, lauric acid and oleic acid, and coagulating the applied coating solution, said coagulation being carried out in a coagulating bath of water, an aqueous solution of an inorganic salt or an organic liquid which is a non-solvent to the polymer but is miscible with said organic solvent.

2. The process as claimed in claim 1 wherein the inorganic salt is selected from the group consisting of sodium sulfate, sodium chloride, potassium sulfate and potassium chloride.

3. The process as claimed in claim 1 wherein the concentration of the inorganic salt in said aqueous solution is less than two-thirds saturation.

4. The process as claimed in claim 1 wherein the concentration of the inorganic salt is less than one-third saturation.

5. The process as claimed in claim 1 wherein the amount of the higher fatty acid is 5–20% by weight based on the polyurethane.

6. The process as claimed in claim 1 wherein the coagulation step is carried out at a temperature of 5–50° C.

7. The process as claimed in claim 6 wherein said temperature is 20–40° C.

8. The process as claimed in claim 1 further including the step of washing the coagulated applied coating solution to remove the organic solvent and the fatty acid therefrom, then drying same.

9. The process as claimed in claim 8 further including the step of buffing the surface of the dried washed coagulated applied coating solution.

10. The process as claimed in claim 1 wherein the amount of polyurethane in said coating solution is 10–40% by weight, based on the organic solvent.

11. The process as claimed in claim 10 wherein the amount of polyurethane is 15–35%.

12. The process as claimed in claim 1 wherein said coagulation is carried out in an aqueous solution of an inorganic salt.

References Cited

UNITED STATES PATENTS

| | | | |
|---|---|---|---|
| 2,871,218 | 1/1959 | Schollenberger | 260—45.4 |
| 2,950,214 | 8/1960 | Smith | 117—62.2 |
| 3,100,721 | 8/1963 | Holden | 117—63X |
| 3,020,176 | 2/1962 | Robinson et al. | 117—62.2 |
| 3,214,290 | 10/1965 | Larner et al. | 117—135.5 |
| 3,284,274 | 11/1966 | Hulslander et al. | 161—159 |
| 3,348,963 | 10/1967 | Fukushima et al. | 117—135.5X |
| 3,424,604 | 1/1969 | Fukushima et al. | 117—135.5X |
| 3,483,015 | 12/1969 | Fukushima et al. | 117—135.5X |
| 3,486,968 | 12/1969 | Mater | 117—135.5X |
| 3,496,001 | 2/1970 | Minobe et al. | 117—63UX |

WILLIAM D. MARTIN, Primary Examiner

M. R. LUSIGMAN, Assistant Examiner

U.S. Cl. X.R.

117—11, 62, 64, 155R, 161KP